US011895743B2

(12) United States Patent
Schlipf

(10) Patent No.: US 11,895,743 B2
(45) Date of Patent: Feb. 6, 2024

(54) ELECTRICAL HEATING ELEMENT, ELECTRICAL HEATING DEVICE, AND METHOD FOR MANUFACTURING AN ELECTRICAL HEATING DEVICE WITH SUCH A HEATING ELEMENT

(71) Applicant: Türk & Hillinger GmbH, Tuttlingen (DE)

(72) Inventor: Andreas Schlipf, Tuttlingen (DE)

(73) Assignee: TÜRK & HILLINGER GMBH, Tuttlingen (DE)

( * ) Notice: Subject to any disclaimer, the term of this patent is extended or adjusted under 35 U.S.C. 154(b) by 630 days.

(21) Appl. No.: 17/069,736

(22) Filed: Oct. 13, 2020

(65) Prior Publication Data

US 2021/0112632 A1 Apr. 15, 2021

(30) Foreign Application Priority Data

Oct. 15, 2019 (DE) ..................... 10 2019 127 691.8

(51) Int. Cl.
*H05B 3/03* (2006.01)
*H05B 3/06* (2006.01)
(Continued)

(52) U.S. Cl.
CPC ................ *H05B 3/40* (2013.01); *H05B 3/03* (2013.01); *H05B 3/06* (2013.01); *H05B 3/08* (2013.01);
(Continued)

(58) Field of Classification Search
None
See application file for complete search history.

(56) References Cited

U.S. PATENT DOCUMENTS 2,360,263 A * 10/1944 Osterheld ................ H05B 3/42 338/234
2,360,267 A * 10/1944 Osterheld ................ H05B 3/42 338/262
(Continued)

FOREIGN PATENT DOCUMENTS

CN 201044517 Y 4/2008
CN 201352860 Y * 11/2009
(Continued)

OTHER PUBLICATIONS

CN201044517, Apr. 2008, Li et al, Bib data sheet (Year: 2008).*
Office Action dated Aug. 11, 2022 in Chinese patent application No. 2020 1110 6481.6 and English Translation of Office Action.

*Primary Examiner* — Joseph M. Pelham
(74) *Attorney, Agent, or Firm* — Panitch Schwarze Belisario & Nadel LLP

(57) ABSTRACT

An electrical heating element for an electrical heating device is provided, wherein the electrical heating element is made from a coiled resistive wire with flat ribbon geometry and one or two connector assemblies, wherein the resistive wire with flat ribbon geometry is coiled into coils with an inner diameter, an outer diameter, and a distance between adjacent coils such that the flat side of the resistive wire with flat ribbon geometry runs parallel to the coil axis, and wherein the connector assemblies have at least one connection element that is in surface-area contact with a section of the resistive wire with flat ribbon geometry. In addition, an electrical heating device with such an electrical heating element and a method for manufacturing such an electrical heating device are also provided.

14 Claims, 7 Drawing Sheets

(51) Int. Cl.

| | |
|---|---|
| ***H05B 3/08*** | (2006.01) |
| ***H05B 3/44*** | (2006.01) |
| ***H05B 3/48*** | (2006.01) |
| ***H05B 3/40*** | (2006.01) |
| *H05B 3/42* | (2006.01) |

(52) U.S. Cl.
CPC .................. *H05B 3/42* (2013.01); *H05B 3/48* (2013.01); *H05B 2203/017* (2013.01)

(56) References Cited

U.S. PATENT DOCUMENTS

| | | | | | | |
|---|---|---|---|---|---|---|
| 2,947,963 | A | * | 8/1960 | Oakley | H05B 3/48 | 338/238 |
| RE29,949 | E | * | 4/1979 | Churchill | H05B 3/06 | 338/238 |
| 4,349,727 | A | * | 9/1982 | Churchill | H05B 3/06 | 219/544 |
| 9,468,041 | B2 | * | 10/2016 | Gros | H05B 1/0244 | |
| 10,076,002 | B2 | * | 9/2018 | Schlipf | H05B 3/06 | |
| 11,102,848 | B2 | * | 8/2021 | Boehmer | H05B 3/82 | |
| 11,477,858 | B2 | * | 10/2022 | Hanamachi | H05B 3/03 | |
| 2006/0289474 | A1 | * | 12/2006 | Johnson | H05B 3/48 | 219/544 |
| 2021/0112629 | A1 | * | 4/2021 | Schlipf | H05B 3/02 | |
| 2021/0112632 | A1 | * | 4/2021 | Schlipf | H05B 3/08 | |
| 2021/0298130 | A1 | * | 9/2021 | Schlipf | B21D 51/16 | |
| 2022/0110191 | A1 | * | 4/2022 | Schlipf | H05B 3/06 | |

FOREIGN PATENT DOCUMENTS

| | | | | | |
|---|---|---|---|---|---|
| DE | 102013212205 | A1 | * | 12/2014 | H01C 1/02 |
| DE | 102020006821 | A1 | * | 5/2022 | |
| EP | 2820916 | B1 | * | 8/2019 | H05B 3/565 |
| EP | 3883338 | A1 | * | 9/2021 | |

* cited by examiner 10
1
Aw
W
S
Q
B
H
D1
D2
2
3
4
5
5a
6
6a
7
7a

ELECTRICAL HEATING ELEMENT, ELECTRICAL HEATING DEVICE, AND METHOD FOR MANUFACTURING AN ELECTRICAL HEATING DEVICE WITH SUCH A HEATING ELEMENT

CROSS-REFERENCE TO RELATED APPLICATION

This application claims priority under 35 U.S.C. § 119 to German Patent Application No. 10 2019 127 691.8, filed on Oct. 15, 2019, the disclosure of which is incorporated herein by reference in its entirety.

BACKGROUND OF THE INVENTION

One of the main difficulties in manufacturing an electrical heating device for a certain application consists in developing an electrical heating element that can satisfy the desired heating output at the specified parameters and also can be manufactured with safe and reliable processing and can absorb the loads occurring during long-term operation—for example, the mechanical work as a reaction to the execution of heating cycles and resulting material and machine fatigue.

Especially for electrical heating devices that operate at low voltages of, e.g., 12 V, and therefore must be operated with high currents, a small resistor and thus a large wire cross section must be housed in a small space, so that this also withstands thermal cycle loading over a long time period. In addition, safe and reliable processing to form a connection to a small cross section between an unheated zone and a heated zone must also be ensured, which is suitable, in particular, for high current loads.

One problem consists in providing, for example, a suitable electrical heating element for high current loads of several amperes that is suitable for an electrical heating device with a small cross section of, in particular, less than one cm and that can withstand high thermal cycle loads.

BRIEF SUMMARY OF THE INVENTION

This task is solved by an electrical heating element with the features described herein, an electrical heating device with the features described herein, and a method for manufacturing an electrical heating device with such an electrical heating element with the features described herein. Advantageous refinements of the invention are the subject matter of the respective dependent claims and additional features described herein.

The electrical heating element according to the invention for an electrical heating device consists of a coiled resistive wire with flat ribbon geometry and at least one, usually one or two, connector assemblies. Here, the resistive wire with flat ribbon geometry is coiled into coils that have—as usual—an inner diameter, an outer diameter, and a distance between adjacent coils, such that the flat sides of the resistive wire with flat ribbon geometry run essentially parallel to the coil axis. Here, the term "essentially" is used, because strictly speaking, the width of the flat ribbon makes it run somewhat below the angle of the coil pitch; the coiling process can also cause deformation of the flat ribbon. In other words, this means that a cylindrical lateral surface of an imaginary cylinder is produced, whose cylinder axis is formed by the coil axis, on which one of the wide sides of the resistive wire lie, wherein the imaginary cylinders each differ by their radius (and indeed essentially by the height of the resistive wire with flat ribbon geometry).

While in most cases two connector assemblies are used at the two ends of the coiled resistive wire with flat ribbon geometry, an embodiment with only one connector assembly could also be realized if the electrical metallic sheath of one electrical heating device, in which the electrical heating element is installed, is used as a return line and is therefore electrically connected directly or indirectly to one end of the coiled resistive wire with flat ribbon geometry, or there can be embodiments with two connector assemblies on the same side.

The connector assemblies have at least one connection element that is in surface-area contact with one section of the resistive wire with flat ribbon geometry. This connection element can be, in particular, a connector pin or a tube as explained below in more detail.

Even if the term does not need to be explained, it is to be mentioned here that flat ribbon geometry of the resistive wire is used here in the sense of a property of the cross section of the resistive wire that is perpendicular to the profile direction of the resistive wire. This cross section is essentially rectangular with a long extent direction that defines the width and a short extent direction that defines the height. The corners, however, could be rounded and the profile of the sides, especially in the direction of the height, but also in the direction of the width, do not have to be exactly linear. In fact, the coiling up of a resistive wire with flat ribbon geometry can slightly influence the ideal essentially rectangular cross-sectional geometry, which still, however, justifies the use of the term flat ribbon geometry.

The flat side of the resistive wire is to be understood as the side that runs essentially parallel to the long extent direction of its cross section.

The use of the coiled resistive wire with flat ribbon geometry in the orientation, in which the flat side runs parallel to the coil axis has the result, on one hand, that even if the electrical heating device, in which the electrical heating element is used, can have only a small diameter, a resistive wire, which has a significant cross section, can be used, which is important for high current loads. In contrast to elongated resistive wires with a relatively large cross section, which have been used before in such situations, the coiled structure enables a more elastic reaction of the electrical heating element to the thermal cycle loading, which leads to significantly slower embrittlement and material fatigue and lower risk of fracture in the solution according to the invention.

In addition, there is a second preferred aspect, namely the fact that a coiled resistive wire with flat ribbon geometry automatically has, in the claimed configuration, larger surfaces as contact surfaces that enable a surface-area contact with the connector assembly, which is associated with big advantages with respect to the process-assured manufacturing of the connection especially with low transfer resistance under high current loading, while known solutions operate either with linear contacts or increase the necessary packaging space and thus increase the minimum diameter that can be achieved for the electrical heating device, in which the electrical heating element is to be used. Optionally, these contact surfaces could also be optimized, for example, by shaping or modifying the end sections of the coiled resistive wire with flat ribbon geometry, for example, by shaping coils with flat ribbon geometry, but also by joining coils with flat ribbon geometry, which then produce a tubular end section of the coiled resistive wire with flat ribbon geometry.

Tests by the applicant have shown that it is advantageous if the width of the resistive wire with flat ribbon geometry corresponds to at least thirty percent (30%) of the coil inner diameter. It has been determined to be especially preferred if the width of the resistive wire with flat ribbon geometry corresponds to the coil outer diameter.

Tests have further shown that the width of the resistive wire with flat ribbon geometry is at least twice as wide as its height; for some applications, it can also reach ten-times the height. Preferably, the height should be selected so that it is large enough that the coiled resistive wire can support its own weight, so that it keeps its shape even if it is supported only on one end, and does not change its shape due to the force of gravity at positions where it is not supported. The height is limited at the upper bounds in particular in that the resistive wire must still be able to form a coil with the coil diameter specified by the application. Flat ribbon cables that are too wide can no longer be coiled very easily with the proper pitch values for the application.

It was also determined experimentally that the distance between adjacent coils is preferably less than the width of the resistive wire with flat ribbon geometry. A distance value of approximately fifteen percent (15%) of the width is considered realistic. The goal is even smaller distance values.

A first, preferred option for manufacturing the surface-area contact between the connector assembly and the resistive wire with flat ribbon geometry consists in that the connector assembly has, as a connection element, a connector pin that is either in an electrical surface-area contact with the inside of at least one coil of the resistive wire with flat ribbon geometry or in an electrical surface-area contact with the inside of a shaped end section of the resistive wire with flat ribbon geometry. In an especially preferred way, this can be achieved if the outer diameter of the connector pin corresponds to either the inner diameter of the coils of the resistive wire with flat ribbon geometry or to a bulge on the inside of the shaped end section of the resistive wire with flat ribbon geometry, wherein the direction of curvature of the bulge corresponds to the direction of curvature of the outer diameter of the connector pin.

In principle, however, it can also be sufficient if sections of the outer contour of the connector pin are adapted to the inner diameter of the coils of the resistive wire and the surface-area contact is realized there, for example, with a quarter-circle-shaped cross-section of the connector pin, in which the radius is adapted to the inner diameter of the coils of the resistive wire.

An even more reliable surface-area contact is guaranteed if the connector pin is in an electrical surface-area contact with all the inner surfaces of one or more coils of the resistive wire with flat ribbon geometry. This can also be realized, in particular, in that several coils of the resistive wire with flat ribbon geometry are connected to each other, so that a tubular section is produced.

Even if a press-fit contact might be sufficient, it is preferred if the connector pin is welded or soldered with a section of an inside of a coil of the resistive wire with flat ribbon geometry or with the inside of the shaped end section of the resistive wire with flat ribbon geometry. This also simplifies, in particular, the handling of the electrical heating element as one unit during the assembly of an electrical heating device with such an electrical heating element.

A preferred material for the connector pin is, e.g., nickel due to its good weldability and simultaneous relatively high electrical conductivity; mild steel and copper are also suitable for many applications.

To keep undesired heat generation in the area of the connection assemblies as low as possible, it is advantageous if the connector assembly also has a tube that is manufactured from a material with at least the same, preferably a higher conductance value than the material from which the connector pin is made, wherein the tube has a tube inner wall adapted at least in some sections to the outer contour of the connector pin, so that between the tube and connector pin there is an electrical surface-area contact. Preferably, the outer diameter of the tube is not larger than the outer diameter of the heating wire coil, in order not to increase the required packaging space. The tube can be made, in particular, from copper.

If necessary, the heat generation in the area of the connector assembly can be further increased by a refinement of this configuration in which a second connection pin manufactured from a material with at least the same, preferably a higher conductance value than the material from which the connector pin is made is arranged inside the tube from the side facing away from the coiled resistive wire with flat ribbon geometry.

An alternative option for realizing a surface-area contact between the connector assembly and coiled resistive wire with flat ribbon geometry and for simultaneously avoiding the undesired heat generation in the area of the connector assembly as much as possible consists in that the connector assembly has, as a connection element, a tube, whose tube inside is in an electrical surface-area contact with the outside of a shaped end section of the coiled resistive wire with flat ribbon geometry inserted into the tube, wherein the tube is manufactured from a material with a higher conductance value than the material from which the coiled resistive wire with flat ribbon geometry is made.

This shaped end section can be made, for example, into a round or oval shape; it can be manufactured in an especially simple way, however, as a variant in which the shaped end section is formed by coils of the coiled resistor with flat ribbon geometry, which have a reduced outer diameter.

The undesired heat generation in the area of the connector assembly can be reduced even more by modifying the configuration just described such that a second connector pin, which is manufactured, in particular, from a material with a higher conductance value than the material from which the coiled resistive wire with flat ribbon geometry is made, is arranged inside the tube from the side facing away from the coiled resistive wire with flat ribbon geometry.

To use the packaging space provided for the electrical heating element in an electrical heating device optimally, it is advantageous if the largest outer diameter of the connector assembly corresponds to the outer diameter of the coiled resistive wire with flat ribbon geometry.

The electrical heating device according to the invention has a tubular metallic sheath and an electrical heating element according to the invention, wherein in the interior of the tubular metallic sheath at least the coiled resistive wire with flat ribbon geometry of the electrical heating element is arranged so that it is isolated electrically at least in some sections from the tubular metallic sheath.

The method according to the invention for manufacturing an electrical heating device with a tubular metallic sheath comprises the steps of

- manufacturing a coiled resistive wire with flat ribbon geometry,
- preparing connector assemblies or components of connector assemblies and a tubular metallic sheath
- joining the connector assemblies and the coiled resistive wire with flat ribbon geometry for forming an electrical heating element, manufacturing a surface-area contact between end sections of the coiled resistive wire and at least one connection element of each connector assembly, inserting the electrical heating element, at least in some sections, into an interior of the tubular metallic sheath, inserting an electrically isolating material into the remaining empty volume of the interior of the tubular metallic sheath, and compacting the electrical heating device preconfigured in this way.

It is to be noted here that the sequence of the method is only partially fixed. The two steps mentioned first for the method could also be performed in the opposite order, but they must logically be performed before the other steps. It is important to emphasize this because the electrical heating element being used must already have a coiled resistive wire with flat ribbon geometry in order to correspond to the preferred invention. A deformation of a coiled resistive wire preferably does not take place for the first time in the installed state. Also, the latter method step preferably also takes place after the introduction of the electrically conductive material.

The other steps mentioned above for the method, however, do not have to be performed in this order and can also be carried out partially in parallel or together.

In principle, for example, joining a connector assembly and the coiled resistive wire with flat ribbon geometry for forming an electrical heating element can also be performed at the same time with the manufacturing of a surface-area contact between end sections of the coiled resistive wires and parts of a connector assembly, for example, if parts of the connector assembly and sections of the resistive wire are connected to each other by compacting, soldering, or welding processes.

It is also to be taken into account that the insertion of only the coiled resistive wire with flat ribbon geometry completely without or with still incomplete connector assemblies represents in any case a section-wise insertion of the electrical heating element into an interior of the tubular metallic sheath, because this represents a section of the electrical heating element.

The manufacturing of the coiled resistive wire with flat ribbon geometry can be realized by coiling up a resistive wire with flat ribbon geometry or, more precisely, a section of a wire with flat ribbon geometry, which was manufactured in this shape as an endless material, which can be realized, for example, on a mandrel with the desired coil inner diameter. For this procedure, however, considerable forces are sometimes needed for the coiling, which applies especially to the feeding motion for achieving the coil pitch.

One possible alternative consists in that the manufacturing of the coiled resistive wire with flat ribbon geometry is realized by coiling up an arbitrary resistive wire, for example, on a mandrel that specifies the desired coil inner diameter and subsequent shaping of the resistive wire into the flat ribbon geometry. In this way, the coiling can be simpler, but the compacting step must be performed with very high precision, in order to not actually undo the desired coil geometry and to ensure that the flat ribbon geometry has the desired properties.

A third option for providing the coiled resistive wire with flat ribbon geometry consists in providing a tubular resistive wire with a groove in the form of a helical line, which can be achieved, for example, by laser cutting, passing through the tube wall. This helical line can extend across the entire length of the tube; if, however, it is not formed in the end areas of the tubular resistive wire, in this way there are also equal tubular connection sections that correspond to the connection (or omission of separation) of several coils of the coiled resistive wires with flat ribbon geometry.

One procedure for manufacturing the surface-area contact consists in that a connector assembly is provided with a connector pin, whose outer diameter preferably corresponds to the inner diameter of the coils of the resistive wire with flat ribbon geometry, and that for manufacturing the surface-area contact, the connector pin is either pushed into the coiled resistive wire with flat ribbon geometry or brought into contact with the inside of a shaped end section of the resistive wire with flat ribbon geometry such that it is in an electrical surface-area contact with the inside of at least one coil of the coiled resistive wire with flat ribbon geometry. Here it is advisable to stabilize the surface-area contact by welding or soldering.

In a second procedure, it is provided that a connector assembly is prepared, which has a tube, in which one end section of the coiled resistive wire with flat ribbon geometry is shaped so that it is adapted to the tube opening, and in which the electrical surface-area contact is created by inserting the end section into the tube opening, wherein the assembly is preferably later stabilized by a compacting processing step.

BRIEF DESCRIPTION OF THE SEVERAL VIEWS OF THE DRAWING

The foregoing summary, as well as the following detailed description of the preferred invention, will be better understood when read in conjunction with the appended drawings.

For the purpose of illustrating the preferred invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figures 1A, 1B, 9A, 9B:
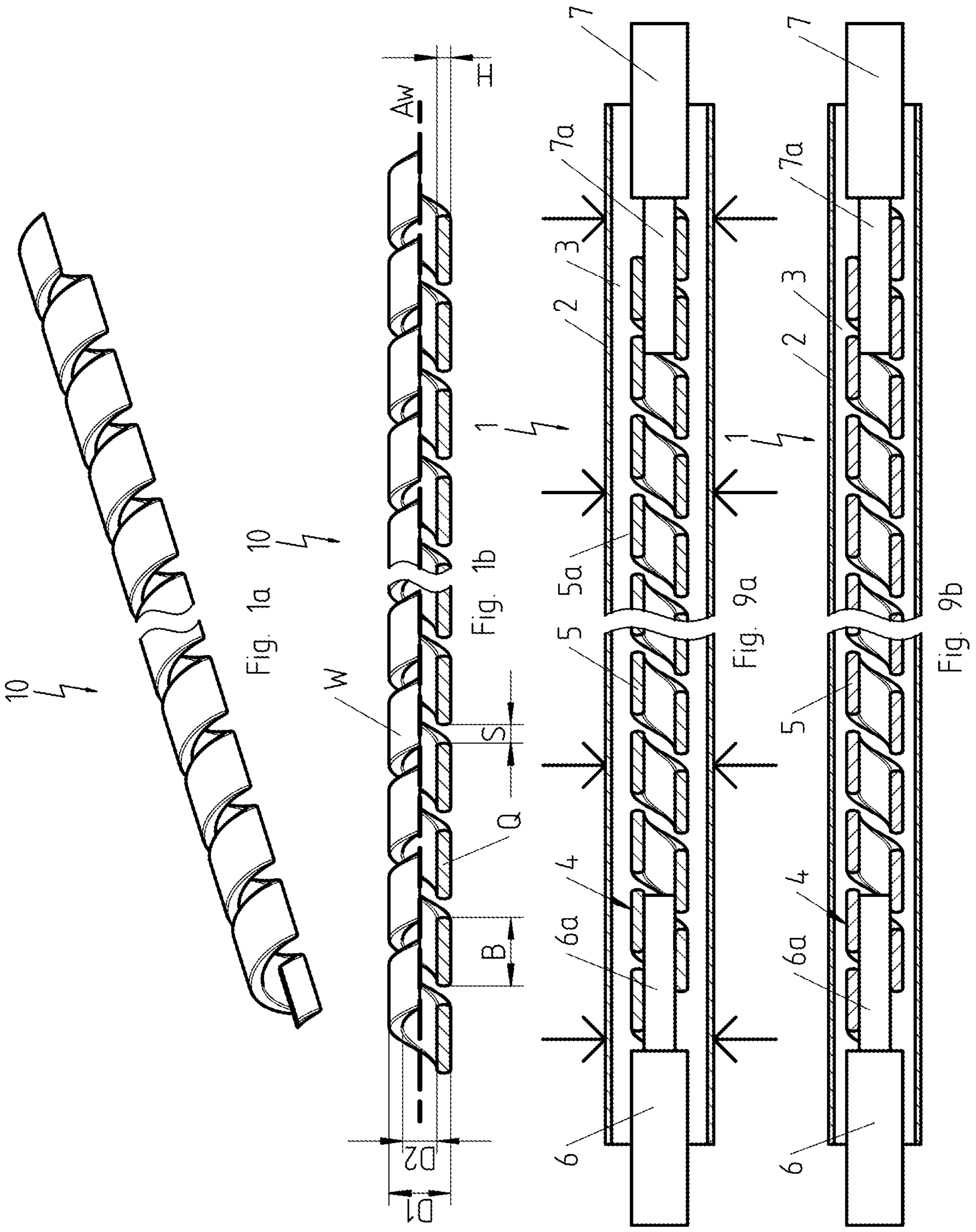
FIG. 1*a* is a coiled resistive wire with flat ribbon geometry in accordance with a first preferred embodiment of the present invention.
FIG. 1*b* is a cross section view through the coiled resistive wire with flat ribbon geometry from FIG. 1*a,*
FIG. 9*a* is a cross section through an electrical heating device before the compacting process in accordance with an additional preferred embodiment of the present invention.
FIG. 9*b* is a cross section through the electrical heating device from FIG. 9*a* after a compacting process.

FIG. 1*a* shows a coiled resistive wire 10 with flat ribbon geometry, as it could be used in a preferred embodiment of a heating element according to the invention; FIG. 1*b* shows a section through the coiled resistive wire 10 with flat ribbon geometry from FIG. 1*a*, wherein a series of sizes with which the flat ribbon geometry and the coiled arrangement can be characterized are shown. The essentially rectangular cross-sectional surfaces Q can be seen with a long extent direction that defines a width B and a short extent direction that defines a height H. The individual coils W, which each run around a dashed coil axis Aw, have an outer diameter D1 and an inner diameter D2 and adjacent coils W are distanced from each other by a distance S.

In particular, in the shown coiled resistive wire 10 with flat ribbon geometry, it can be seen that

- the width B of the resistive wire 10 with flat ribbon geometry corresponds approximately to the coil outer diameter D1,
- the width B of the resistive wire 10 with flat ribbon geometry is approximately five-times (35X) larger than its height H, and
- the distance S between adjacent coils W is less than the width B of the resistive wire W with flat ribbon geometry, more precisely, approximately twenty-five percent (25%) of the width B.

Figure 2A:
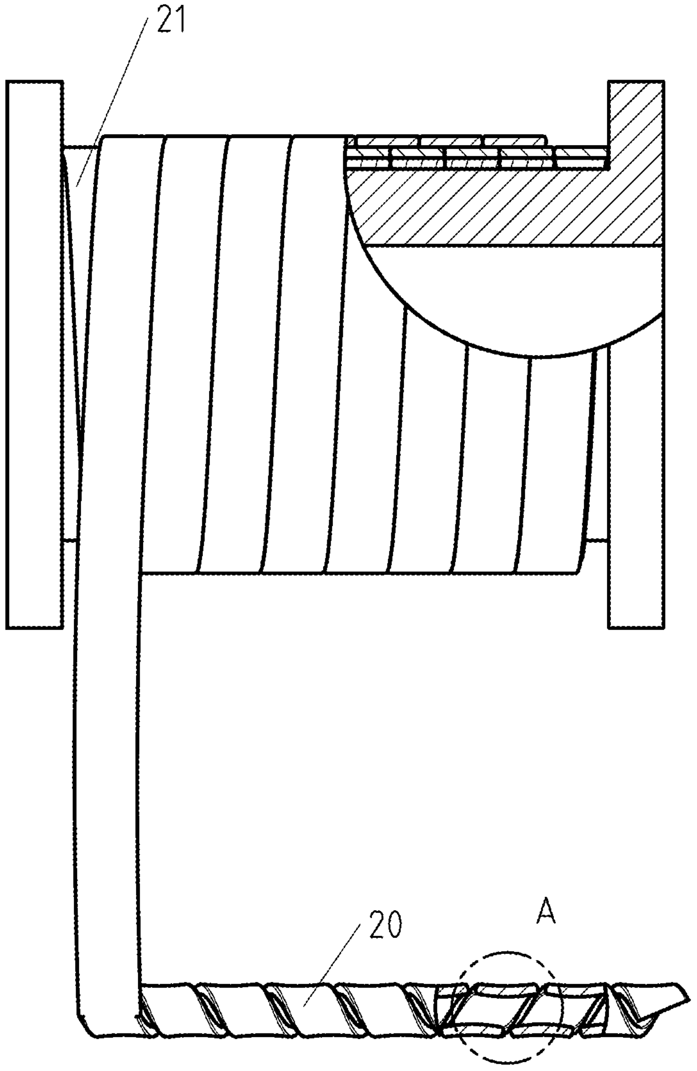
FIG. 2*a* is a side elevational and partial cross sectional view of a barrel for providing the wire to form the coiled resistive wire with flat ribbon geometry of FIG. 1*a,*
Figure 2B:
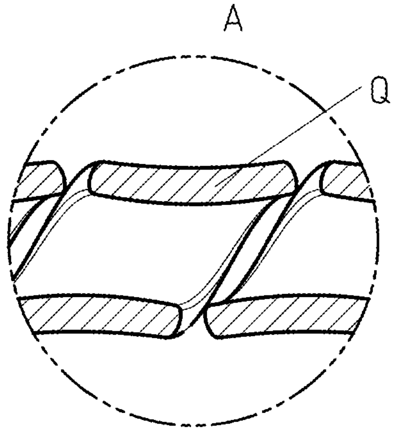
FIG. 2*b* is a detailed and magnified cross sectional view of the coiled resistive wire with flat ribbon geometry taken from within shape A of FIG. 2*a,*

FIGS. 2*a* and 2*b* illustrate schematically one option for manufacturing the coiled resistive wire with flat ribbon geometry. Here, on a barrel 21, a resistive wire with flat ribbon geometry is realized, which was manufactured in this shape as an endless material, which can be realized, for example, on a not-shown mandrel with the desired coil inner diameter, in order to manufacture the coiled resistive wire 20 with flat ribbon geometry. For this procedure, however, significant forces are sometimes needed for the coiling, which is clear, in particular, in the detailed view of FIG. 2*b* on the cross section Q', which deviates differently than in the partially open area of FIG. 2*a* from an ideal rectangular form on all side lines and at the corners, but still has nearly identical width and thickness.

Figure 3B:
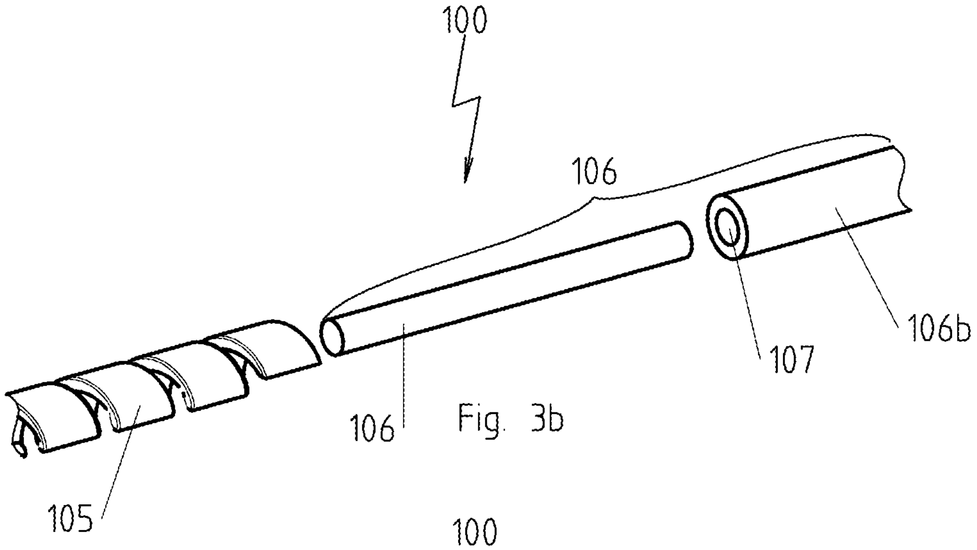
FIG. 3*b* is an exploded view of the configuration of the connector assembly from FIG. 3*a,*
Figure 3A:
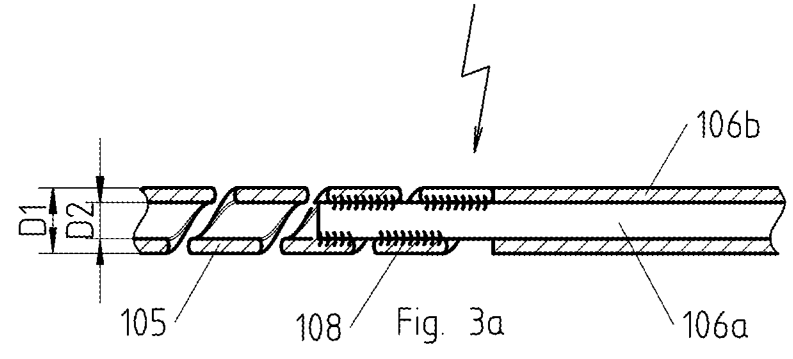
FIG. 3*a* is a cross-sectional view of an area of an electrical heating element for a first configuration of the connector assembly in accordance with another preferred embodiment of the present invention.

FIGS. 3*a* and 3*b* show one option for manufacturing the surface-area contact between the coiled resistive wire 105 with flat ribbon geometry and a connector assembly 106 for an electrical heating element 100 shown in sections. In this example, the connector assembly 106 consists on one hand from the connector pin 106*a* made from nickel as the connection element, whose diameter is adapted to the inner diameter D2 of the coiled resistive wire 105 with flat ribbon geometry, and on the other hand from the tube 106*b* made from, for example, copper, whose tube opening 107 likewise corresponds to the inner diameter D2 of the coiled resistive wire 105 with flat ribbon geometry and whose outer diameter is adapted to the outer diameter D2 of the coiled resistive wire 105 with flat ribbon geometry. One section of the connector pin 106*a* is pushed into the interior of the coiled resistive wire 105 with flat ribbon geometry so far that it almost completely passes through two coils and is welded to these coils, as the schematically shown weld seams 108 are intended to illustrate. For increasing the conductance value, the rest of the connector pin 106*a* is pushed into the tube 106*b*; here, e.g., a press-fit contact can be formed.

Figure 4B:
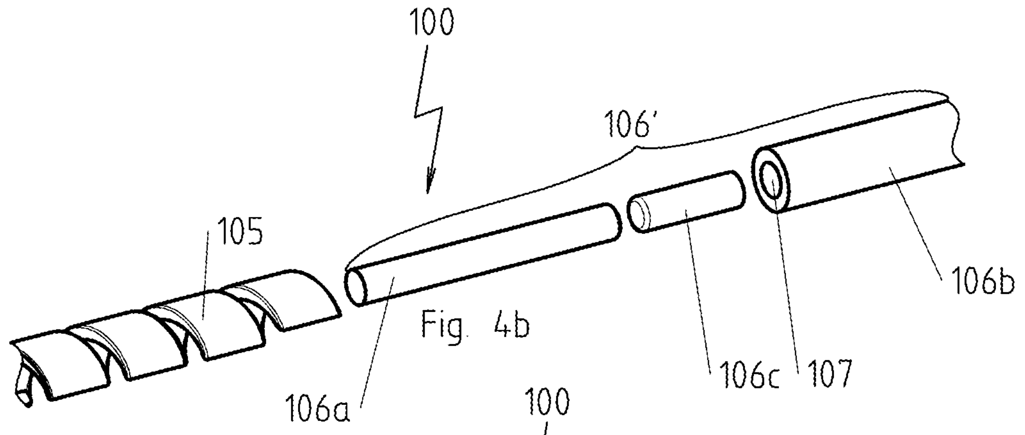
FIG. 4*b* is an exploded view of the configuration of the connector assembly from FIG. 4*a,*
Figure 4A:
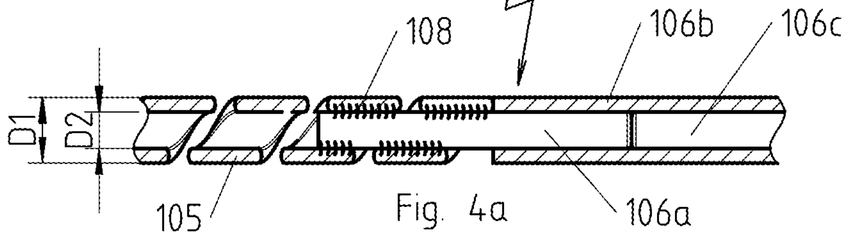
FIG. 4*a* is a cross-sectional view of an area of an electrical heating element for a second configuration of a connector assembly in accordance with an additional preferred embodiment of the present invention.

The variant shown in FIGS. 4*a* and 4*b* differs in that the connector assembly 106' there has, as an additional component, a second connector pin 106*c* that is made from copper and is adapted to the inner diameter of the tube 106*b* and is pushed due to contact with the connector pin 106*a* from the side facing away from the coiled resistive wire with flat ribbon into the tube 106*b* and further improves the conductance value of the connector assembly 106. Because this is substantially the only difference, identical reference symbols are otherwise used and refer to the description for FIGS. 3*a* and 3*b*.

Figure 5B:
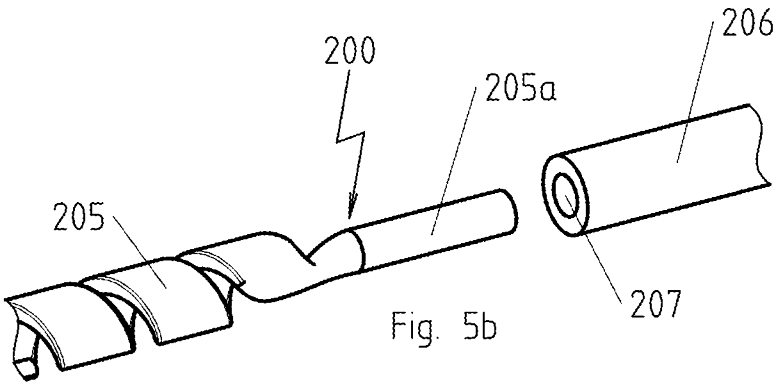
FIG. 5*b* is an exploded, side perspective view of the configuration of the connector assembly from FIG. 5*a,*
Figure 5A:
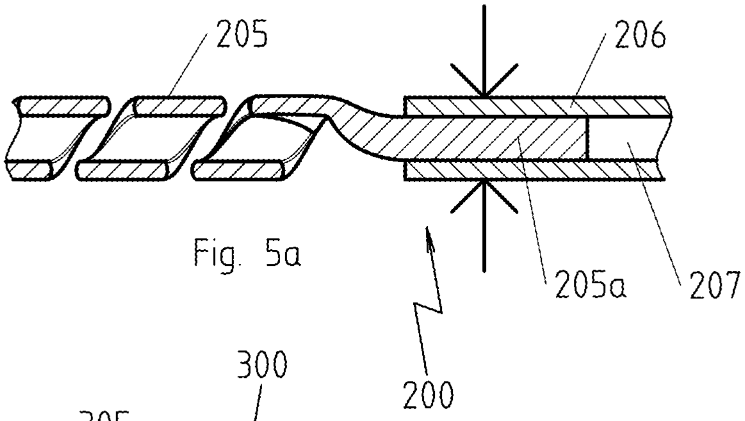
FIG. 5*a* is a cross-sectional view of an area of an electrical heating element for a third configuration of a connector assembly in accordance with another preferred embodiment of the present invention.

FIGS. 5*a* and 5*b* illustrate another option for manufacturing, for an electrical heating element 200 shown section-wise, the surface-area contact between the coiled resistive wire 205 with flat ribbon geometry and a connector assembly 206, which consists, in this example, only from a tube, the connection element, made, for example, from copper. Here, one end section 205*a* of the coiled resistive wire 205 with flat ribbon geometry is shaped so that it is adapted to the tube opening 207 of the tube, and the electrical surface-area contact is manufactured in that the end section is inserted into the tube opening 207 and compacted.

Figure 6B:
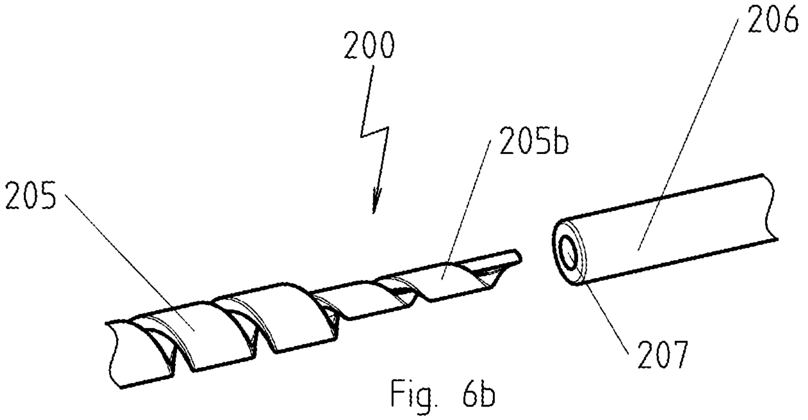
FIG. 6*b* is an exploded, side perspective view of the configuration of the connector assembly from FIG. 6*a,*
Figure 6A:
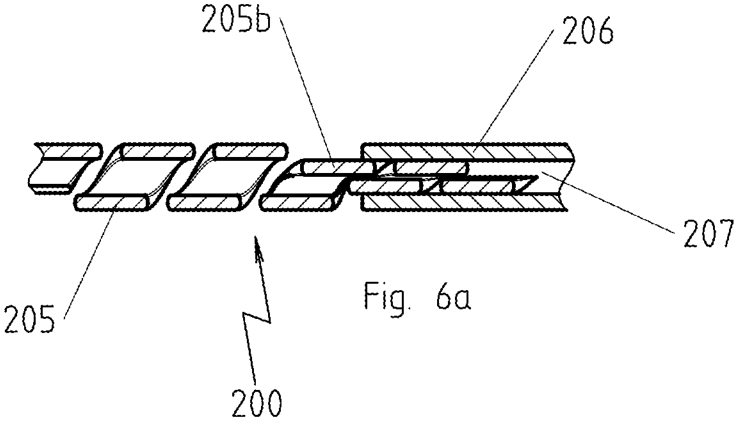
FIG. 6*a* is a cross-sectional view of an area of an electrical heating element for a fourth configuration of a connector assembly in accordance with an additional preferred embodiment of the present invention.

FIGS. 6*a* and 6*b* show an alternative to the embodiment of FIGS. 5*a* and 5*b*. Here there is also, for electrical heating element 200 shown section-wise, a surface-area contact between the coiled resistive wire 205 with flat ribbon geometry and a connector assembly 206, which consists of the tube, the connection element, made only from, for example, copper.

The difference consists substantially only in that the end section 205*b* of the coiled resistive wire 205 with flat ribbon geometry is adapted to the tube opening 207 of the tube such that, in this end section, the coil outer diameter is reduced such that it corresponds to the diameter of the tube opening 207 of the tube. The electrical surface-area contact can be manufactured in that the end section 205*b* of the coiled resistive wire with flat ribbon geometry is inserted into the tube opening 207 and compacted.

Figure 7B:
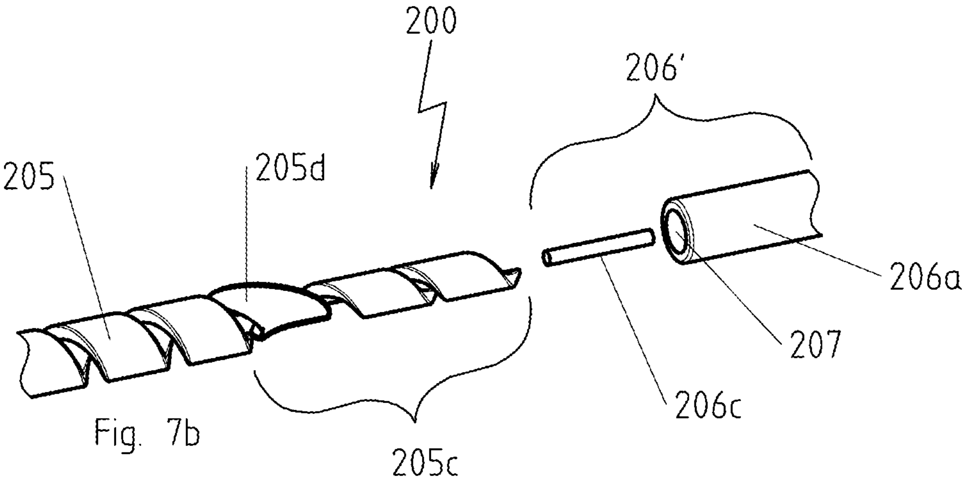
FIG. 7*b* is an exploded, side perspective view of the configuration of the connector assembly from FIG. 7*a,*
Figure 7A:
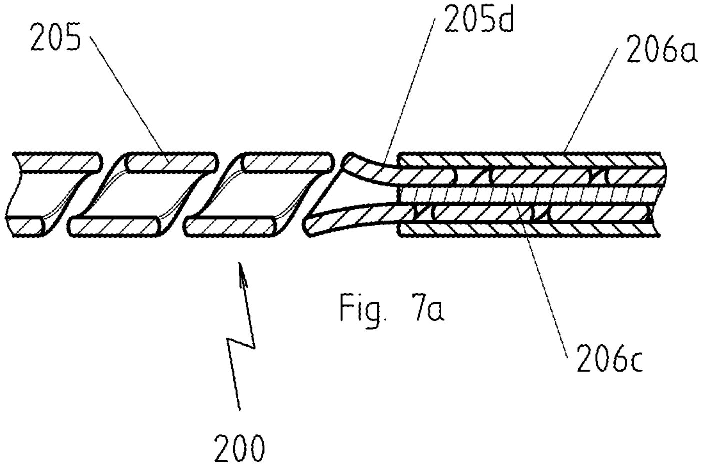
FIG. 7*a* is a cross-sectional view of an area of an electrical heating element for a fifth configuration of a connector assembly in accordance with a further preferred embodiment of the present invention.

The variant of the electrical heating element 200 shown in FIGS. 7*a* and 7*b* differs in two essential aspects from the variant of FIGS. 6*a* and 6*b:*

First, here, the end section 205*c* of the coiled resistive wire 205 with flat ribbon geometry is also adapted to the tube opening 207 of the tube such that, in this end section, the coil outer diameter is reduced such that it corresponds to the diameter of the tube opening 207 of the tube.

The transition of the coil outer diameters is here shaped, however, so that the transition is not between two coils, but instead between a coil 205*d*, whose coil outer diameter is different at the opposing edges of the coil.

Second, in addition to the tube 206*a*, the connector assembly 206' has a connector wire 206*c* made from a material with electrically good conductive characteristics and the coil inner diameter in the end section 205*c* of the coiled resistive wire 205 is dimensioned such that the connector wire 206*c* can be inserted into the coils of the end section 205*c* of the coiled resistive wire 205 with flat ribbon geometry. Then the tube 206*a* of the connector assembly 206 can be pushed on the outside onto the end section 205*c* of the coiled resistive wire 205 and the contact can be manufactured by a compacting process, so that the tube 206*a* and the connector wire 206*c* form the connection elements.

In principle, these two changes with respect to the embodiment of FIGS. 6*a* and 6*b* are dependent on each other and can be used individually for modifying the embodiment. Thus, the transition to the end section 205*a* of the coiled resistive wire 205 with flat ribbon geometry can be realized without the connector wire 206*c* in the embodiment according to FIGS. 6*a* and 6*b* with a coil that is shaped like the coil 205*d*. Likewise, the end section 205*b* from FIGS. 6*a* and 6*b* can be shaped so that the coils belonging to the end section have an open inner diameter that allows the use of a connector assembly 206' with the tube 206*a* and the connector wire 206*c*.

Figure 8B:
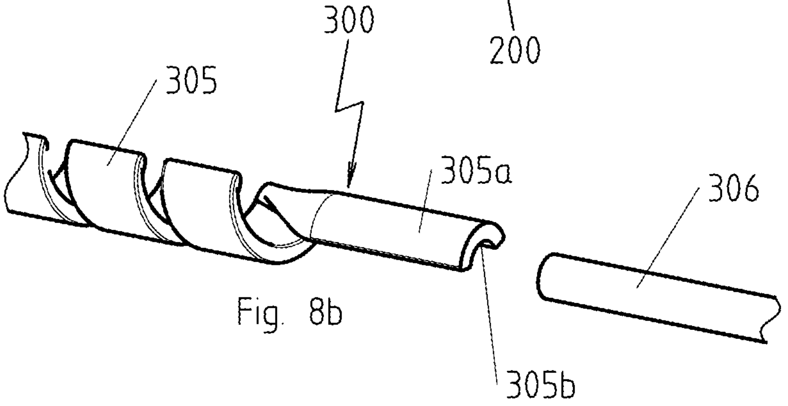
FIG. 8*b* is an exploded, side perspective view of the configuration of the connector assembly from FIG. 8*a,*
Figure 8A:
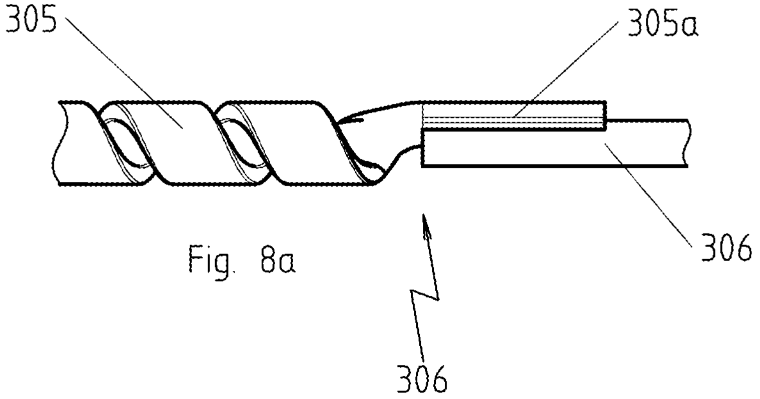
FIG. 8*a* is a side perspective view of an area of an electrical heating element for a sixth configuration of a connector assembly in accordance with another preferred embodiment of the present invention.

The embodiment of FIGS. 8*a* and 8*b* shows another variant. The electrical heating element 300 according to this variant has a connector assembly 306 that consists only of one connector pin as the connection element, which can be made, for example, from nickel, and also a coiled resistive wire 305 with flat ribbon geometry, whose end section 305*a* is shaped to be able to form an electrical surface-area contact with the connector assembly 306.

To realize this, the shaped end section 305*a* of the coiled resistive wire 305 with flat ribbon geometry is provided with a bulge 305*b* on its inside, where the direction of curvature of the bulge 305*b* corresponds to the direction of curvature of the outer diameter of the connector pin of the connector assembly 306 and is adapted to this outer diameter.

FIGS. 9*a* and 9*b* show an electrical heating device 1 before and after the compacting process. The electrical heating device 1 has a tubular metallic sheath 2, in whose interior an electrical heating element 4, which consists of a coiled resistive wire 5 with flat ribbon geometry and connector assemblies 6, 7, is inserted section-wise and is electrically isolated with electrically isolating material 3, e.g., magnesium oxide, from the tubular metallic sheath 2. The flat side of the flat ribbon runs parallel to the not-shown coil axis. The electrical surface-area contact between the coiled resistive wire 5 and the connector assemblies is realized by means of connector pins 6*a*, 7*a*, which are part of the connector assemblies 6, 7, and were described in essentially the same way as above with reference to FIGS. 3*a*, 3*b*. One difference, however, is that there is no welding here, but instead a press-fit contact is formed in the compacting process.

Figure 10:
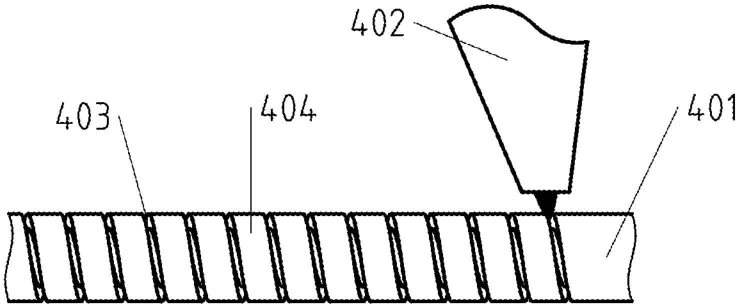
FIG. 10 is another example option for providing a coiled resistive wire with flat ribbon geometry in accordance with a preferred embodiment of the present invention.

FIG. 10 shows another example option for providing a coiled resistive wire 405 with flat ribbon geometry. This configuration starts with a tubular resistive wire 401, in which a helical-line-shaped groove 403 passing through the tube wall is cut with a laser 402, in order to generate the coils 404.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

1 Electrical heating device
2 Metallic sheath
3 Electrically insulating material
4,100,200,300 Electrical heating element
5,10,20,105,205,305,405 Resistive wire
6,7,106,106',206,206',306 Connector assembly
6*a*,7*a*,106*a* Connector pin
21 Barrel
106*b*,206*b* Tube
106*c* Second connector pin
107,207 Tube opening
108 Weld seam
205*a*,205*b*,205*c*,305*a* End section
205*d* Coil
206*c* Connector wire
305*b* Bulge
401 Tubular resistive wire
402 Laser
403 Helical groove
404 Coil
Q,Q' Cross-sectional surface area
B Width
D1 Outer diameter
D2 Inner diameter
H Height
S Distance
W Coil
Aw Coil axis

The invention claimed is:

1. An electrical heating element for an electrical heating device, the electrical heating element comprising:

a coiled resistive wire with a flat ribbon geometry and a connector assembly, wherein the resistive wire is coiled into coils with an inner diameter, an outer diameter, and a distance between adjacent coils wherein a flat side of the resistive wire runs parallel to a coil axis of the resistive wire, and wherein the connector assembly has at least one connection element that is in surface contact in one section of the resistive wire, a largest outer diameter of the connecting assembly being equal to the outer diameter of the coiled resistive wire.

2. The electrical heating element according to claim 1, a width of the resistive wire to is at least thirty percent (30%) of the inner diameter of the coils.

3. The electrical heating element according to claim 2, wherein the width of the resistive wire is equal to the outer diameter of the coils.

4. The electrical heating element according to claim 1, wherein a width of the resistive wire is at least twice as large as a thickness of the resistive wire.

5. The electrical heating element according to claim 1, wherein the distance between adjacent coils is less than a width of the resistive wire.

6. The electrical heating device according to claim 1, further comprising:

a tubular metallic sheath having an interior, at least the coiled resistive wire is arranged within the tubular metallic sheath so that it is electrically insulated, at least in some sections, from the tubular metallic sheath.

7. An electrical heating element for an electrical heating device, the electrical heating element comprising:

a coiled resistive wire with a flat ribbon geometry and a connector assembly, wherein the resistive wire is coiled into coils with an inner diameter, an outer diameter, and a distance between adjacent coils, wherein a flat side of the resistive wire runs parallel to a coil axis of the resistive wire, and wherein the connector assembly has at least one connection element that is in surface contact in one section of the resistive wire, the connector assembly has, as a connection element, a connector pin that is in surface contact with an inside of one of the coils of the resistive wire or in surface contact with an inside of a shaped end section of the resistive wire, wherein the connector assembly furthermore has a tube that is constructed of a material with a higher conductance value than a material from which the connector pin is constructed, the connector assembly has a tube opening adapted at least in some sections to an outer contour of the connector pin, so that an electrical surface contact is formed between the tube and the connector pin.

8. The electrical heating element according to claim 7, wherein an outer diameter of the connector pin is one of the inner diameter of the coils of the resistive wire and a bulge on an inside of the shaped end section of the resistive wire, wherein a direction of curvature of the bulge is a direction of curvature of the outer diameter of the connector pin.

9. The electrical heating element according to claim 8, wherein the connector pin is in an electrical surface contact with an entire inner surface of at least one of the coils of the resistive wire.

10. The electrical heating element according to claim 7, wherein the connector pin is one of welded and soldered to one of a section of an inner surface of the coils of the resistive wire and the inside of the shaped end section of the resistive wire.

11. The electrical heating element according to claim 7, wherein the connector pin is constructed of nickel.

12. The electrical heating element according to claim 7, wherein the connector pin includes a first connector pin and a second connector pin, the second connector pin constructed of a material with a higher conductance value than a material from which the first connector pin is constructed, the connector pin is arranged inside the tube from the side facing away from the coiled resistive wire.

13. An electrical heating element for an electrical heating device, the electrical heating element comprising:

a coiled resistive wire with a flat ribbon geometry and a connector assembly, wherein the resistive wire is coiled into coils with an inner diameter, an outer diameter, and a distance between adjacent coils, wherein a flat side of the resistive wire runs parallel to a coil axis of the resistive wire, and wherein the connector assembly has at least one connection element that is in surface contact in one section of the resistive wire, wherein the connector assembly is comprised of two connector assemblies, each of the connector assemblies including a connection element and a tube, the tube having an inside that is in an electrical surface contact with an outside of a shaped end section of the resistive wire, the shaped end section inserted into the tube, wherein the tube is constructed a material with a higher conductance value than a material from which the resistive wire is constructed.

14. The electrical heating element according to claim 13, wherein the shaped end section is formed as an extension of the coils of the resistive wire and is comprised of end coils, the shaped end section having a reduced outer diameter compared to the outer diameter.

* * * * *